United States Patent [19]

Chambers et al.

[11] 4,050,036
[45] Sept. 20, 1977

[54] OPTICAL SYSTEM FOR LASERS

[75] Inventors: William A. Chambers, North Tonawanda; Franklin B. Bossler, Williamsville; Warren F. Brandkamp, Batavia, all of N.Y.

[73] Assignee: Textron Inc., Providence, R.I.

[21] Appl. No.: 661,361

[22] Filed: Feb. 25, 1976

[51] Int. Cl.$^2$ ............................................. H01S 3/081
[52] U.S. Cl. ................................. 331/94.5 C; 350/299
[58] Field of Search .................... 331/94.5; 350/299

[56] References Cited

U.S. PATENT DOCUMENTS

| | | | |
|---|---|---|---|
| 3,909,744 | 9/1975 | Wisner et al. | 331/94.5 C |
| 3,950,712 | 4/1976 | Chenausky et al. | 331/94.5 C |
| 3,969,687 | 7/1976 | Freiberg et al. | 331/94.5 C |
| 3,969,688 | 7/1976 | Freiberg et al. | 331/94.5 C |

*Primary Examiner*—William L. Sikes
*Attorney, Agent, or Firm*—Bean, Kauffman & Bean

[57] ABSTRACT

A laser configuration is disclosed wherein the active region is of annular cylindrical form. Zero mode azimuth coupling which produces an output beam of low obscuration ratio in the near field, thereby providing a single lobe in the far field, is achieved by the use of an unstable optical resonator characterized by an annular mirror defining one end of the resonator and a two stage axiconic reflector disposed optically between the opposite ends of the resonator.

4 Claims, 4 Drawing Figures

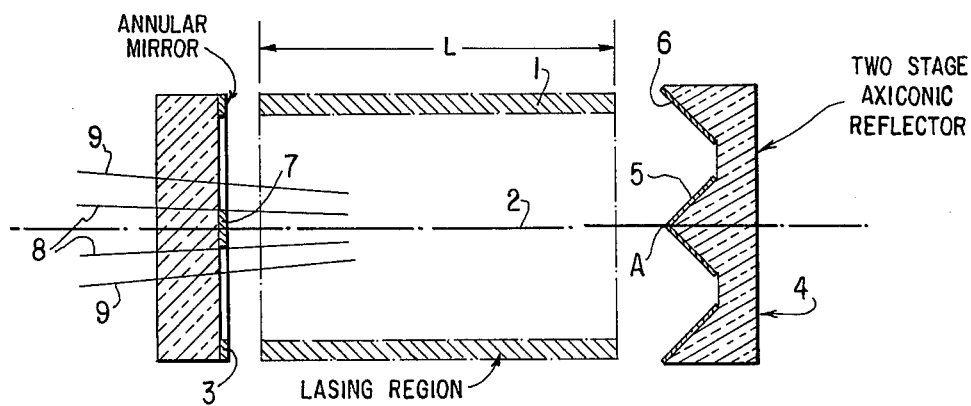
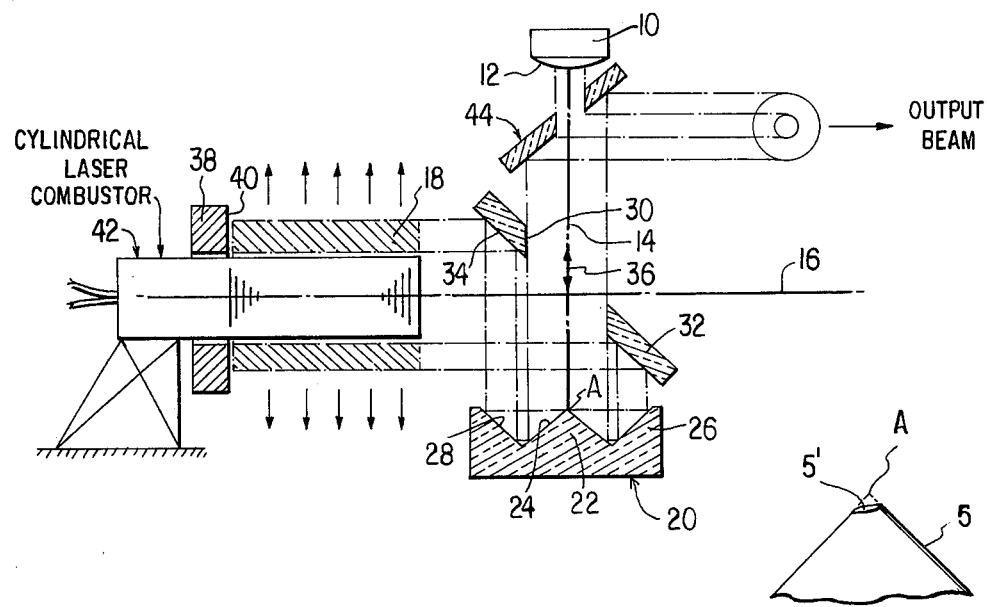
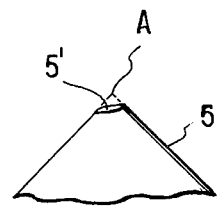
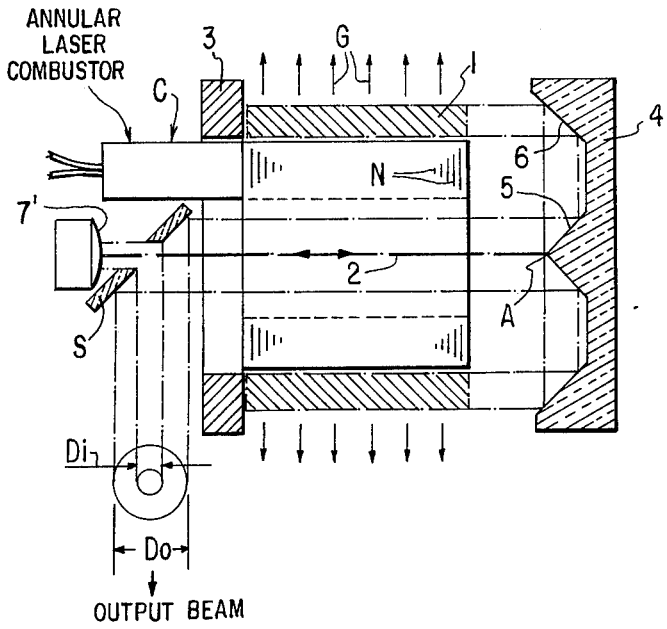

OPTICAL SYSTEM FOR LASERS

This invention was made under contract N00014-74-C-0337 with the U.S. Navy.

BACKGROUND OF THE INVENTION

The invention relates to lasers with unstable optical resonators having totally reflecting optics providing azimuth mode coupling, and in particular to such systems employing high optical gain.

The construction of high power output lasers requires increasing the mode volume. Although this may be accomplished with stable resonators by coupling the output beams of several lasers together into a single output beam, as in U.S. Pat. No. 3,855,544, the approach is complex and expensive and, as in cases where high output power is transmitted through partially transmitting optics, the optics may be destroyed by thermal heating because of absorption thereby of some fraction of the output power. In general, stable resonators do not couple to large volumes efficiently.

Unstable optical resonators are common in the art for providing coupling, with good optical quality, to large volumes as, for example in U.S. Pat. No. 3,824,487. By good optical quality is meant that coupling is achieved with uniform azimuth and radial modes without phase reversal in the output aperture. However, conventional unstable resonators utilize a cylindrical volume of active gain medium and in order to achieve the requisite large volume for high power output as achieved herein one must resort to inordinately long systems. In consequence, the physical characteristics of the optical systems tend to become impractical when high power outputs are attempted with conventional lasers employing unstable resonators.

BRIEF SUMMARY OF THE INVENTION

The primary object of this invention is to provide a system wherein a large lasing volume is optically coupled to a single azimuth mode by means of optics so configured that manufacturing and mounting are practical.

It is also an object of this invention to provide a laser construction in which the resonator is coupled to the zero order azimuth mode to produce an output beam having an obscuration ratio which provides a single lobe in the far field.

In general, this objective is accomplished by providing a lasing region which is in the form of an annular cylinder in conjunction with an annular mirror at one end of the lasing region and a two-stage axiconic reflector located beyond the other end of the lasing region. By axiconic is meant that class of optical elements disclosed in the following publications:

1. J. H. McLeod, J. Opt. Soc. Am. 44, 592 (1954)
2. J. H. McLeod, J. Opt. Soc. Am. 50, 166 (1960)
3. W. R. Edmonds, Appl. Opt. 12, 1940 (1973)
4. G. S. Bakken, Appl. Opt. 13, 1291 (1974)

The two-stage axiconic reflectors as employed herein consist of inner and outer reflecting elements preferably facing in the same direction. The two-stage axiconic reflectors which is sometimes termed herein a "compactor".

The basic configuration described above lends itself well to arrangements of large mode volume and consequent high output power. The lasing region may be produced, for example, by a flowing gas laser employing a large cylindrical combustor.

Stated otherwise, this invention involves an unstable optical resonator having reflecting elements at its opposite ends, one of which is in the form of an annular mirror disposed to reflect the electromagnetic radiation as a phase coherent optical field through an annular, cylindrical, lasing medium to impinge upon a two-stage axiconic reflector disposed beyond the opposite end of the optical field. The other end of the resonator is formed by suitable reflector means aligned optically with the axis of the two-stage axiconic reflector, at least one reflecting surface of the resonator being formed to provide the divergent optical function characteristic for an unstable resonator, and there being means disposed between such axiconic reflector or compactor and said other end of the resonator to couple some of the energy out of the resonator.

BRIEF DESCRIPTION OF THE DRAWING FIGURES

FIG. 1 is a diagrammatic view illustrating certain principles of the invention;

FIG. 2 is a view similar to FIG. 1 but showing a preferred embodiment of the invention;

FIG. 3 is a view similar to FIG. 1 but showing another embodiment of the invention; and FIG. 4 is a fragmentary view illustrating a representative inherent imperfection in one of the optical components.

DETAILED DESCRIPTION OF THE INVENTION

FIG. 1 illustrates the basic relationships of the invention. An unsymmetrical, unstable optical resonator is shown in association with a lasing region 1 in the form of a thin annular cylinder which defines the axis 2. One end of the resonator is formed by the annular mirror 3 located adjacent one end of the phase coherent optical field or lasing region 1 whereas the other end of the resonator is formed by the small central mirror 7. Located beyond the other end of the region 1 is the two-stage axiconic reflector or compactor 4 which comprises an inner axiconic element or member 5 and an outer axiconic element or member 6. In accord with general axiconic theory, the reflecting surfaces 5 and 6 are surfaces of revolution and conveniently, may be conical surfaces as illustrated. The two axiconic elements are concentric with the apex A of the inner element 5 lying on the axis 2. Any of the surfaces 3, 5, 6 or 7 may be so shaped or be relatively oriented as to provide the necessary divergent function whereby the geometric rays reflected by the resonator will walk out of the system as indicated by the extreme rays 8 and 9 in FIG. 1.

The annular mirror 3 is coaxial with axis 2 as is the two-stage axiconic reflector 4 and, as will be evident, the resonator is thereby coupled to that aximuth mode which is of zero order. With the configuration shown, an increase in the mode volume whereby the output power may be increased does not require the length L of the region 1 to be increased. Rather, to increase the output power one may simply increase the diameter of the region 1. Such an arrangement, employing a large flowing gas laser is illustrated in FIG. 3.

In FIG. 3, a large diameter annular combustor C, which may for example be a $CO_2$ laser combustor, is employed, producing the annular cylindrical lasing region 1. In FIG. 3, the combustor is illustrated in elevation whereas the optical elements are illustrated in section. The annular body of the combustor C is provided with nozzles diagrammatically illustrated at N from which the flowing gas issues radially as indicated by the arrows G, the lasing region being confined to a thin, annular region surrounding the combustor C.

The optical arrangement in FIG. 3 is identical with that described in FIG. 1 except for the resonator end reflector 7' which, as shown in FIG. 3, is a convex reflecting element for providing the requisite divergent function to render the resonator unstable. FIG. 3 also illustrates the output coupling mirror or scraper S which couples the energy out of the system in the form of the annular output beam whose cross section in the near field is illustrated in FIG. 3. Using conventional notation, the inner diameter of the output beam is designated $D_i$ whereas its outer diameter is designated $D_o$. It is a desirable feature of this invention that the obscuration ratio $D_i/D_o$ may be made not greater than about 0.5.

Within the resonator itself there is a further obscuration caused by the fact that the apex A cannot be made perfectly. This is illustrated diagrammatically in FIG. 4 wherein the tip of the apex of the conical reflecting surface 5 is illustrated as truncated or flattened as indicated at 5', representing the effect of an inherent deviation of the physical surface from a mathematically perfect surface. The spacing along the axis 2 between the end reflector 7' and the apex A must be sufficient such that the area of the obscured region 5' must be small (i.e. less than 0.25) as compared to the area of the first Fresnel zone at the apex A as viewed from the reflecting surface 7'. By observing this condition, losses in the fundamental mode are minimized.

Because cylindrical annular combustors are difficult to construct, a preferred embodiment of the invention is as illustrated in FIG. 2. The unstable optical resonator of FIG. 2 comprises the totally reflecting resonator end mirror 10 having a convex reflecting surface 12 and the optical axis 14 of this mirror is oriented so as to be perpendicular to the axis 16 of the annular working medium region 18. Disposed on the opposite side of the axis 16 from the resonator mirror 10 and optically aligned therewith is the two-stage axiconic reflector indicated generally by the reference character 20. The axiconic reflector 20 is also totally reflecting and includes the central conical portion 22 whose reflecting surface 24 includes an angle of about 135° with the axis 14, and an annular, outer conical portion 26 whose reflecting surface 28 intersects at right angles with the surface 24. As shown, the base of the central portion 22 is of a diameter equal to the diameter of the resonator mirror 10 and to the diameter of the central opening 30 presented by the fold mirror 32. The fold mirror 32 is also totally reflecting and is aligned at an angle of 45° with respect to the axis 14 and such that its reflecting surface 34 reflects axis 14 into axis 16, so that it lies in a plane passing through the intersection 36 of the axes 14 and 16 and with the opening 30 being centered on such intersection.

The end mirror 38 is of annular configuration and is centered on the axis 16. The mirror 38 is also totally reflecting and its reflecting surface 40 may be flat or it may be toroidal. The cylindrical laser combustor 42 projects through the opening afforded by the mirror 38 and discharges the inverted medium in the radially outwardly flowing working zone 18. The combustor 42 may be, for example, a $CO_2$ laser combustor. Energy is reflectively coupled out of the resonator by means of the scraper mirror 44.

In all embodiments of the invention not only is the number of optical elements small but also their configurations are practical and their mounting is simplified. The special configuration of the two-stage axiconic reflector is of special interest because it combines two axiconic reflectors in a single device instead of the two separate elements of the "reflaxicon" described in publication 3 mentioned above. Although it is possible to use the "reflaxicon" configuration in this invention to produce an unsymmetrical unstable resonator, or two such "reflaxicons" at the opposite ends of the annular cylindrical lasing region to form a symmetrical unstable resonator, the mounting of the central axicon element (or elements) in each case poses a difficult problem. Consequently, the illustrated two-stage axiconic reflector wherein the inner and outer elements face in the same direction is an important contribution.

What is claimed is:

1. An improved laser construction comprising, in combination:
   a cylindrical laser combustor for generating a phase coherent optical field in the form of an annular cylinder which defines an axis;
   unstable optical resonator means for producing an output beam from said field, which output beam is of low obscuration ratio;
   said resonator means comprising an annular reflector centered on said axis and located adjacent one end of said field, said reflector having a reflecting surface facing toward the other end of said field and defining one end of the resonator means; a two stage axiconic reflector located beyond said other end of the field and optically aligned with said annular reflector, said axiconic reflector comprising an inner axiconic element and an outer axiconic element concentric therewith and said inner and outer elements both facing in the same direction; and reflecting means located in spaced opposed relationship to said two stage axiconic reflector and in alignment with said inner element to define the other end of said resonator means;
   means for coupling some of the energy out of said resonator means;
   the axis of said axiconic reflector being disposed at right angles to the axis of said field; and
   an annular fold mirror disposed between said axiconic reflector and said reflecting means whereby optically to align said outer element with said annular reflector.

2. Apparatus for producing a collimated beam of electromagnetic radiation having an annular distribution in the near field, comprising in combination:
   laser combustor means for producing a lasing zone which is centered on a particular axis;
   an unstable optical resonator system associated with said lasing zone, said system comprising a convex resonator mirror disposed beyond one end of said lasing zone and oriented such that its optical axis is perpendicular to the axis of said lasing zone, an annular mirror disposed beyond the other end of said lasing zone and centered with respect to said particular axis of said lasing zone, a two-stage axiconic reflector disposed in spaced relation to said resonator mirror such that said particular axis of the lasing zone lies between them, said two-stage axiconic reflector comprising a central conical portion converging toward and optically aligned with said resonator mirror and an annular conical outer portion converging toward said central conical portion in direction away from said resonator mirror, and an annular fold mirror centered on the optical axis between said resonator mirror and said two-stage axiconic reflector to pass electromagnetic radiation between said conical central region and said resonator mirror while reflecting electromagnetic radiation back and forth between said two-stage axiconic reflector and said annular mirror; and means disposed between said fold mirror and said resonator mirror for reflectively coupling a fraction of said electromagnetic radiation out of said resonator as a coherent beam having said annular distribution in the near field.

3. An unstable optical resonator for lasers having an active region in the form of an annular cylinder, which comprises:

an annular mirror defining one end of the resonator and disposed coaxial with a particular axis;

a two-stage axiconic reflector spaced from said annular mirror and comprising coaxial inner and outer axiconic elements forming a single unit aligned along an axis perpendicular to said particular axis, said inner axiconic element having an apex and said outer axiconic element reflecting electromagnetic radiation back and forth through the active region to said annular mirror;

reflecting means defining the other end of said resonator and spaced from and facing said apex; and an annular fold mirror disposed between said outer axiconic element and said annular mirror.

4. An improved laser construction providing an output beam of low obscuration ratio in the near field so that the output beam provides a single lobe in the far field, comprising in combination:

a cylindrical laser combustor providing a lasing region of annular cylindrical form and defining a particular axis;

an annular mirror defining one end of an unstable resonator and disposed coaxial with said particular axis adjacent one end of said lasing region;

a two stage axiconic reflector spaced from said annular mirror beyond the other end of said lasing region and comprising coaxial inner and outer axiconic elements forming a single unit and aligned along an axis perpendicular to said particular axis, said inner axiconic element having an apex and said outer axiconic element reflecting electromagnetic radiation back and forth through said lasing region to said annular mirror;

reflecting means defining the other end of said resonator and spaced from and facing said apex; and an annular fold mirror disposed between said outer axiconic element and said annular mirror.

* * * * *